(12) United States Patent
Shi

(10) Patent No.: US 12,353,517 B2
(45) Date of Patent: Jul. 8, 2025

(54) METHOD FOR VALUE MAPPING AND EXERCISE OF DIGITAL RIGHTS

(71) Applicant: SUZHOU HYPERCHAIN INFORMATION SCIENCE & TECHNOLOGY CO., LTD., Jiangsu (CN)

(72) Inventor: Xingguo Shi, Jiangsu (CN)

(73) Assignee: PARALISM CO., LTD., Tokoyo (JP)

( * ) Notice: Subject to any disclaimer, the term of this patent is extended or adjusted under 35 U.S.C. 154(b) by 236 days.

(21) Appl. No.: 18/023,498

(22) PCT Filed: Jun. 24, 2021

(86) PCT No.: PCT/CN2021/101951
§ 371 (c)(1),
(2) Date: Feb. 27, 2023

(87) PCT Pub. No.: WO2022/057359
PCT Pub. Date: Mar. 24, 2022

(65) Prior Publication Data
US 2023/0315816 A1 Oct. 5, 2023

(30) Foreign Application Priority Data
Sep. 17, 2020 (CN) .......................... 202010982713.8

(51) Int. Cl.
*G06F 21/10* (2013.01)
*G06F 21/33* (2013.01)
*G06Q 30/0201* (2023.01)

(52) U.S. Cl.
CPC .............. *G06F 21/10* (2013.01); *G06F 21/33* (2013.01); *G06Q 30/0206* (2013.01); *G06F 21/1014* (2023.08)

(58) Field of Classification Search
CPC ...... G06F 21/10; G06F 21/33; G06F 21/1014; G06Q 30/0206; G06Q 40/04; Y04S 10/50; Y04S 50/14
See application file for complete search history.

(56) References Cited

U.S. PATENT DOCUMENTS 10,861,095 B1 * 12/2020 Koch ............... G06Q 20/38215
2006/0161657 A1 * 7/2006 Gupta ..................... H04L 61/00
709/224

(Continued)

FOREIGN PATENT DOCUMENTS

| CN | 110599345 A | 12/2019 |
| CN | 110689412 A | 1/2020 |

(Continued)

OTHER PUBLICATIONS

International Search report of PCT/CN2021/101951 dated Sep. 24, 2021.

*Primary Examiner* — Sm A Rahman
(74) *Attorney, Agent, or Firm* — Dilworth & Barrese, LLP.; Michael J. Musella, Esq.

(57) ABSTRACT

A method for value mapping and exercise of digital rights, the method comprising: an operation pool, namely, a data structure T, and two operations, namely, a G operation and an E operation, performed on the operation pool. The G operation increases or decreases elements of T in the same direction and correspondingly increases or decreases credentials s. The E operation increases or decreases the elements of T in opposite directions and correspondingly locks or releases credentials corresponding to the elements. The increase or decrease in the credentials s can be mapped to the asset attribute changes of the rights; the increase or decrease in the elements of T can be mapped to the market value changes of the rights. The G operation and the E operation are independent from each other and semantically (Continued)

self-consistent. The operation pool T remains semantically self-consistent before and after each operation. Therefore, the method can maintain the semantic integrity during operation under a decentralization condition and improves the exercise efficiency.

9 Claims, 1 Drawing Sheet

(56) References Cited

U.S. PATENT DOCUMENTS

| | | |
|---|---|---|
| 2020/0077892 A1* | 3/2020 | Tran ....................... G08B 21/02 |
| 2020/0162261 A1 | 5/2020 | Iyer |
| 2021/0042823 A1* | 2/2021 | McClelland ........... G06Q 40/04 |

FOREIGN PATENT DOCUMENTS

| | | |
|---|---|---|
| CN | 111489217 A | 8/2020 |
| CN | 112085606 A | 12/2020 |

* cited by examiner

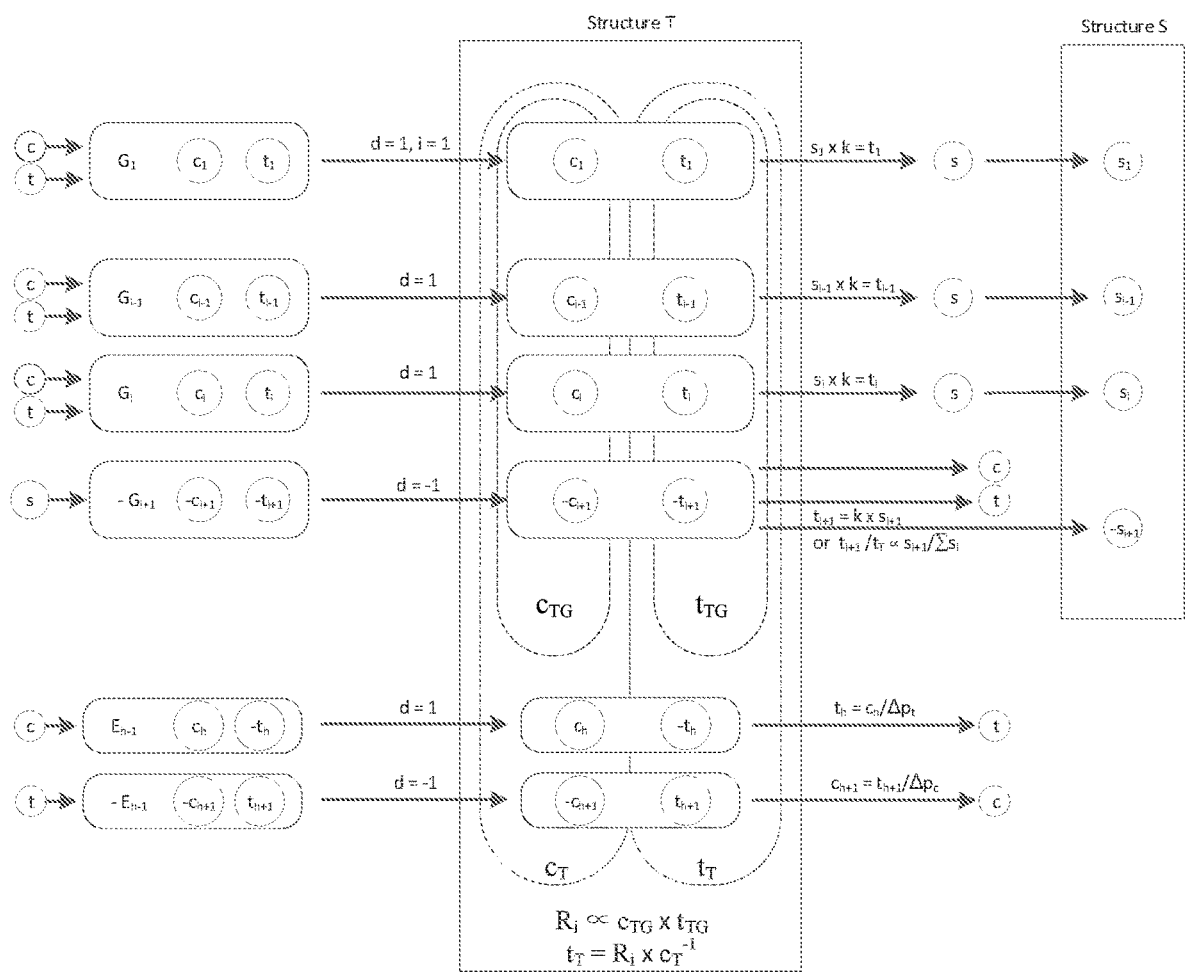

METHOD FOR VALUE MAPPING AND EXERCISE OF DIGITAL RIGHTS

TECHNICAL FIELD

The present invention belongs to the technical field of computers, and particularly relates to a method for value mapping and exercise of digital rights, which realizes right mapping, exchange and exercise without governance and matching in a centralized or decentralized environment.

BACKGROUND ART

In the asset and right transaction field, it is a common means to use computers and networks to handle transaction. For the market that merely takes transaction as an objective and centralized transaction as a basis, it is necessary to deal with the expression of assets and rights directly only according to book information instead of dealing with it in a special way. There are still quite a few artificial processes and matching behaviors in a process of asset issuance, right exercise, and price formation.

There are issuing, transaction and price formation mechanisms. Regarding issuance, artificial pricing and issuance are generally used, and assets or rights are represented in writing and electronic certificates. Transaction means include electronic transaction and artificial transaction, which belong to centralized transaction. Price formation depends on bids of a buyer and a seller, and a transaction price is generated through centralized matching, and is delivered by electronic or artificial means. Traditional assets/rights such as bonds, stocks and futures are all implemented in the above way, by the technical means of a centralized electronic ledger. These methods are not suitable for disposal of digital assets, nor can they be implemented in a decentralized way.

With the development of network and blockchain technologies, a wider range of right and asset types have emerged. Quite a few rights and assets are different from traditional forms, such as cryptocurrencies, game equipment or community management rights. These rights and assets are usually closely related to some online rights. Besides being tradable, they also directly correspond to some value fluctuation strategy. These assets are not suitable for transaction and exercise in the traditional asset market. Some common means of value formation, transaction and exercise include:

1) Definition and Matching by an Issuer

Typical right certificates such as points, game equipment, and promotion codes issued by specific institutions are mainly electronic. An issuer defines and prices these certificates, and provides a final exercise means. This kind of transaction is supported by a centralized transaction system operated by the issuer itself. The technical means is a centralized electronic ledger.

2) Aggregation and Matching by a Middleman

21) Community Type Matching

Common community rights exist in the form of points, rebate levels, account levels, etc. A user generated content (UGC) platform is a typical representative, and a centralized electronic ledger is the technical means. Ownership of this kind of community rights is not clear, and is realized in a centralized way, in the absence of the mapping means related to the ownership.

22) Cryptocurrencies Exchange

Assets in a cryptocurrencies exchange are expressed in the form of digital cryptocurrencies or tokens on a blockchain. Price mapping is realized through traditional centralized matching. A transaction system is implemented by a centralized electronic ledger or distributed ledger technology. A charging and withdrawal system still uses a centralized server to interface with a decentralized blockchain network.

23) Processing by a Blockchain Technology

The decentralized autonomous organization (DAO) uses digital cryptocurrencies or tokens to realize mapping of rights and assets. The exchange of rights and assets is decentralized, but there is no price mapping mechanism. Therefore, price formation and transaction matching of related rights and assets still depend on a centralized exchange.

Decentralized finance (DeFi) uses a decentralized intelligent contract to realize exchange and derivative lending and borrowing business of digital cryptocurrencies, thus solving the problem of price formation and automatic matching to some extent. DeFi is less related to governance and exercise of ownership.

The technical means commonly used in the field include: an electronic certificate technology, a centralized electronic ledger technology, a centralized transaction matching technology, a decentralized digital cryptocurrency technology, a distributed ledger technology and an intelligent contract technology.

For digital rights, a value is an asset attribute, a price is a transaction attribute on the market, and issuance and exercise are governance attributes. The above technical means generally cannot handle these attributes at the same time.

SUMMARY OF THE INVENTION

To solve technical problems in the prior art, the present invention aims to provide a method for value mapping and asset ownership exercise of digital rights. The present invention designs two independent operations bound on a single semantic structure in any network shared storage, which map a transaction attribute on the market and an asset attribute of digital assets respectively, so as to expand mutually independent atomic operation attributes for an exchange operation and an exercise operation, such that right exchange, automatic exercise and governance may be realized without centralized intervention, and then asset issuance, price discovery, transaction and exercise may be completed more efficiently. The method is suitable for both centralized and decentralized cases. After digital rights and ownership are mapped through the method, exercise of ownership of specific assets may be realized without transaction matching and governance. The present invention provides a specific mapping method, such that the mapping processes are transformed according to a set of data configurations and functional relations. When the mapping and transformation are executed according to a data structure designed by the present invention, an automatic transaction and exercise process may be realized without artificial intervention, which is especially suitable for a decentralized application scene.

In the technical solution of the present invention:

A method for value mapping and exercise of digital rights includes:

1) A data structure corresponding to an ownership certificate collection S is established in a shared storage shared by a group of network nodes (including but not limited to shared memory, shared files, shared databases, shared data blocks, etc.), initialized in the manner of $S=\{s_1, s_2, \ldots s_m\}$, by any network node $N_1$. The mth element $s_m$ in the collection S is used to record the quantity of the certificate s for the mth exercise or cancellation of an asset A. The network node $N_1$ continues to establish a data structure corresponding to the ratio group in the shared storage by taking a certain number of digital right tokens X as exercise certificates of the asset A, with the number of exercise certificates $t=k \times s_1$, where k is an exercise mapping ratio; and another type of digital right tokens Y is taken as the price reference certificates (pricing certificates for short) of the asset A, and setting up a variable ratio group $\{c, t\}$, where c is the number of pricing certificates, and s1 is the number of initial voting rights; and the node $N_1$ continues to create a data structure T in the shared storage corresponding to the status record of the certificate operation (hereinafter referred to as the operation pool T), and two operations that act on the operation pool T: operation G and operation E, where the operation refers to a set of instructions or a set of function calls defined by N1, created in the shared storage or broadcasted to other network nodes. The operation G is defined and initialized to implement to increase or decrease of elements in the operation pool data structure T in a same direction and to increase or decrease certificates s accordingly when executing the set of instructions or calls. and The operation E is defined and initialized to implement increase and decrease elements in the operation pool data structure T in an opposite direction and to lock or release certificates corresponding to the elements accordingly when executing the set of instructions or calls. The certificates mentioned in the present invention can be any type of digital certificate (including but not limited to ID, digital token, digital key, handle, digital certificate, etc.).

2) An exercise certificate holder a takes $c_i$ pricing certificates and $t_i$ exercise certificates, and establishes a variable ratio group $G_i = d \times \{c_i, t_i\}$ corresponding to ith operation G, where d indicates an operation direction, d is 1 when an ownership certificate obtaining request is implemented, and d is $-1$ when an ownership certificate transfer request is implemented.

3) The operator can execute $T=T+G_i$ on the operation pool T through any network node Nx in the group (including network node $N_1$), and generate $s_i$ ownership certificates s according to $$s_i = \frac{t_i}{k},$$

updating and $S=\{s_1, s_2, \ldots, s_i\}$; the exercise certificate are generated holder a obtains $s_i$ ownership certificates by exercise, which correspond to $$\frac{s_i}{\sum s_i}$$

ownership of the asset A; corresponding $c_i$ pricing certificates and $t_i$ exercise certificates are locked by the T; and conditions of executing $T=T+G_i$ on the operation pool T include satisfying $$\frac{t_i}{c_i} = \frac{t_T}{c_T}$$

when $i>1$, and satisfying $c_i>0$, $t_i>0$ when $i=1$; a reference price ratio of an exercise certificate satisfying $$p_t = \frac{c_i}{t_i} = \frac{c_T}{t_T},$$

where $t_T$ is the number of current exercise certificates in the operation pool T, and $c_T$ is the number of current pricing certificates in the operation pool T; and a pooling product is computed according to $R_i = c_T \times t_T$ ty after each operation G.

4) The exercise certificate holder a takes $s_i$ certificates s and $d=-1$, and establishes a variable ratio group $G_i = \{-c_i, -t_i\}$ corresponding to the ith operation G according to $t_i = s_i \times k$, $c_i = p_i \times t_i$, and $$p_t = \frac{c_T}{t_T};$$

$T=T+G_i$ is executed on the operation pool T, $s_i$ certificates are locked and canceled by the T, $S=\{s_1, s_2, \ldots, -s_i\}$ is updated, and $t_i$ exercise certificates and $c_i$ pricing certificates are released to the exercise certificate holder a; and the exercise certificate holder a transfers $$\frac{s_i}{\sum s_{i-1}}$$

ownership corresponding to the asset A.

5) When an exercise certificate holder or a pricing certificate holder implements the operation E on the operation pool T, the number of certificates in the operation pool T changes according to $t_T = R_i \times c_T^{-1}$; and an exchange price ratio of an exercise certificate is computed according to $$\Delta p_t = \frac{\frac{Ri}{t_T - \Delta t} - c_T}{\Delta t},$$

or an exchange price ratio of a pricing certificate is computed according to $$\Delta p_c = \frac{\frac{Ri}{c_T - \Delta c} - t_T}{\Delta c}.$$

6) A pricing certificate holder b takes $c_h$ pricing certificates and establishes a variable ratio group $E_h = d \times \{c_h, -t_h\}$ corresponding to hth operation E, where $$t_h = \frac{c_h}{\Delta p_t},$$

d indicates an operation direction, d is 1 when an exercise certificate obtaining request is implemented, and d is $-1$ when an exercise certificate transfer request is implemented; and when $d=1$, $T=T+E_h$ is executed on the operation pool T, and the T locks $c_h$ pricing certificates and releases $t_h$ exercise certificates to the pricing certificate holder b, such that the pricing certificate holder b exchanges $c_h$ pricing certificates for $t_h$ exercise certificates.

7) An exercise certificate holder C takes $t_h$ exercise certificates to be transferred and d=−1, and establishes a variable ratio group $E_h=\{-c_h, t_h\}$ corresponding to the hth operation E, where $$c_h = \frac{t_b}{\Delta p_c};$$

and $T=T+E_h$ is executed on the operation pool T, and the T locks $t_h$ exercise certificates and releases $c_h$ pricing certificates to the exercise certificate holder C, such that the exercise certificate holder C exchanges $t_h$ exercise certificates for $c_h$ pricing certificates.

The present invention designs an operation pool data structure T in the shared storage shared by a group of network nodes, and two sets of operation instructions acting on the data structure T of the operation pool: operation G and operation E. Any node in the group performs the operation G by increasing or decreasing elements of T in the same direction and increasing or decreasing certificates s accordingly, and the information is recorded in the shared data structure S. Any node in the group performs operation E by increasing or decreasing elements of T in an opposite direction and correspondingly locking or releasing certificates corresponding to the elements ("increasing or decreasing in an opposite direction" refers to the increase and decrease relationship of the elements in T being mutually opposite; and elements increased in T are locked correspondingly, and elements decreased in T are released correspondingly). Increase or decrease of the certificates s may be used to map an asset attribute change of rights, and increase or decrease of the elements in T may be used to map a market value change of rights. The operation G and the operation E are independent and semantically self-consistent, and the operation pool T keeps semantically self-consistent before and after each operation. Therefore, the design may keep semantic integrity when running under a decentralized condition.

The method specifically includes:

The initial operator establishes a data structure corresponding operation pool T in the shared storage of the group of network nodes through any network node $N_1$, and creates a data structure S for mapping ownership. The variable ratio group {c, t} is set and a set of instructions or calls corresponding to the G operation are created, stored in the shared storage or broadcasted to other network nodes. The function definition of the G operation is as follows: the ith assignment value of the G operation is recorded as $G_i=\{c_i, t_i\}$, where $T=T+G_i$ (if and only if $$\frac{t_i}{c_i} = \frac{t_T}{c_T},$$

i>1) when operation G is executed on the T; $G_i=d\times\{c_i, t_i\}$, (d=1 or −1), and two different values of d indicate two different operation execution directions; and $S=\{s_1, s_2 \ldots s_i\}$, $s_i=t_i$, $s_i$ indicates the number of certificates s generated or canceled for ith exercise, and $s_i=t_i$ is an execution action in the operation G.

Create an instruction set or call corresponding to operation E and store it in the shared storage or broadcast it to other network nodes. The operation E is defined as follows: The hth value of operation E is recorded as $E_h=\{c_h, -t_h\}$, and when operation E is performed on T, $T=T+E_h$; and $E_h=d\times\{c_h, -t_h\}$, (d=1 or −1).

A corresponding functional relation between $c_T$ and $t_T$ in the operation pool T is $t_T=R_i\times c_T^{-1}$, where $t_T$ is the number of current exercise certificates in the operation pool T, and $c_T$ is the number of current certificates s in the operation pool T. A pooling product $R_i$ is obtained by executing $R_i=c_T\times t_T$ with $c_T$ and $t_T$ after operation $G_i$, and remains unchanged before next operation G; and $R_i\propto c_{TG}\times t_{TG}$, $c_{TG}=\Sigma c_{Gi}$, and $t_{TG}=\Sigma t_{Gi}$. $c_{TG}$ is the sum of $c_i$ in all operations G, and $t_{TG}$ is the sum of $t_i$ in all operations G. It may be seen from the above relation that when operation E is executed, increase or decrease of t is opposite to that of c, for example, t and c represent different resources respectively, a ratio of t to c may reflect a scarcity degree of t relative to c, an inverse ratio of which reflects a value ratio of t to c; and when operation G is executed, t and c increase or decrease in a same direction and a ratio of t to c remains unchanged, and s that increases or decreases with t year on year reflects a total value change represented by S. The data structure S is mapped to an ownership governance interface of an asset A, t is mapped to any type of digital certificates $t_A$, and then the number of s may reflect issuance and redemption of ownership and a proportion of the ownership; exercise may be executed on the asset A by holding $t_A$ by the operation G; when any digital certificate corresponding to c is taken as a price reference, $t_A$ generates a firm price and the price changes in an opposite direction according to supply and demand, which reflects a market price of the asset A; and the issuance and redemption of ownership do not affect a supply and demand price of $t_A$, obtaining and selling of ownership may be realized without matching, and even if the number of $t_A$ is limited, ownership of the asset A may be issued and redeemed indefinitely, such that rigid ownership governance is avoided.

Furthermore, an exercise mapping ratio k is added in the above structural relation, to make $s_i=t_i$ change to $s_i\times k=t_i$, and when k≠1, s and t generate two different governance granularities, with t representing market usability and s representing exercise usability. Operations such as share split or joint stock may be implemented by changing k, thus increasing flexibility of exercise and procedural governance.

As shown in FIG. 1, the technical solution of the present invention is as follows:

Node $N_1$ creates a data structure S corresponding to an ownership set $S=\{s_1, s_2 \ldots s_m\}$ in the shared storage shared among network nodes. The elements in S are mapped to a voting right changes of an asset A, with element $s_m$ used to record the mth voting right change of the asset A, and $s_1$ being the number of initial voting rights. Voting rights correspond to ownership $\{a_1, a_2 \ldots a_n\}$ of the asset A, $\Sigma_{i=1}^n a_i=100\%$, and an element $a_n$ is used to indicate an nth independent exercise/governance unit of ownership. A digital right token is generated as an exercise certificate of the asset A, the number of exercise certificates is $t=k\times s_1$, k is an exercise mapping ratio, and when k is 1, $t=s_1$. A variable ratio group {c, t} is set up, where a pricing token of number c may use any type of valuable digital certificates.

The network node $N_1$ continues to create an instruction set or function call corresponding to the G operation and the E operation in the shared storage, establishing a variable ratio group $\{c_i, t_i\}$ corresponding to the G operation, and constructing $G_1=\{c_1, t_1\}$ by taking a certain number of pricing certificates and exercise certificates, an initial price ratio of right certificates satisfying $$p_t = \frac{c_1}{t_1}.$$

An operation pool data structure T is established by any node $N_1$ in the shared storage shared among network nodes, $T=T+G_1=\{0, 0\}+\{c_1, t_1\}=\{c_1, t_1\}$ is executed, $s_1$ ownership certificates s are generated according to $$s_1 = \frac{t_1}{k},$$

and $S=\{s_1\}$ is updated, the $s_1$ ownership certificates s corresponding to the ownership of the asset A. A pooling product $R_1=c_1\times t_1$.

In the above process, if the number of exercise certificates is greater than $k\times s_1$, $t_f=t-t_1$ certificates do not participate in creation of the variable ratio group $G_1$, and the $t_f$ is an extra-pool certificate, which may be used for extra-pool financing or subsequent government of a right pool.

An exercise certificate holder executes exercise to continue to obtain s corresponding to the ownership of the asset A as follows: At any network node $N_x$, the data structure T and the state of S are read from the shared storage. Based on the current reference price ratio $p_t$ of the operation pool T, a corresponding number of pricing certificates and exercise certificates are provided according to $c_2=t_2\times p_t$ to construct a right group $G_2=\{c_2, t_2\}$. The node $N_x$ performs $T=T+G_2$ on the shared storage's T, and the operation pool T generates $s_2$ ownership certificates s according to $$s_2 = \frac{t_2}{k},$$

where $S=\{s_1, s_2\}$, and $s_2$ ownership certificates correspond to $$\frac{s2}{s1+s2}$$

ownership of the asset A.

The previous step is repeated, and any exercise certificate holder i may obtain $s_i$ ownership certificates by exercise, which correspond to $$\frac{si}{\sum_{i=1}^{n} si}$$

ownership of the asset A.

A holder of an ownership certificate si sells ownership by returning the held $s_i$ to the operation pool T through the execution of a G operation with $d=-1$ on T in the shared storage network via any network node $N_x$, and the operation pool T redeems a corresponding number of exercise certificates according to $t=s\times k$, and redeems a corresponding number of pricing certificates according to $c=p_t\times t$, with a current exchange price ratio $p_t$. After obtaining the redeemed pricing certificates and exercise certificates, the holder no longer owns the ownership of the asset A and then changes to a holder of the exercise certificates. The exercise certificates may be further exchanged for pricing certificates by the operation pool, such that any right certificates are no longer held.

Operation E is implemented on the operation pool T, to realize valuable exchange of pricing certificates and right certificates. The number of certificates in the operation pool T changes inversely according to $t_T=R_i\times c_T^{-1}$, and an exchange price ratio is obtained according to $$\Delta p_t = \frac{\Delta c}{\Delta t}$$

on the function curve. An exchange price ratio of exercise certificates satisfies $$\Delta p_t = \frac{\frac{Ri}{t_T - \Delta t} - c_T}{\Delta t},$$

and an exchange price ratio of pricing certificates satisfies $$\Delta p_c = \frac{\frac{Ri}{c_T - \Delta c} - t_T}{\Delta c}.$$

A pricing certificate holder obtains exercise certificates in the following ways that $c_1$ pricing certificates are taken, a variable ratio group $E_1=\{c_1, -t_1\}$ corresponding to operation E is established with $d=1$ and $$t_1 = \frac{c_1}{\Delta p_t},$$

$T=T+E_1$ is executed, and the T locks $c_1$ pricing certificates and releases $t_1$ exercise certificates.

An exercise certificate holder obtains pricing certificates in the following ways that $t_2$ exercise certificates are taken, a variable ratio group $E_2=\{-c_2, t_2\}$ corresponding to the operation E is established with $d=-1$ and $$c_2 = \frac{t_2}{\Delta p_c},$$

$T=T+E_2$ is executed, and the T locks $t_2$ exercise certificates and releases $c_2$ pricing certificates.

Compared with the prior art, the present invention has the beneficial effects:
1) An exchange price ratio of right certificates is automatically generated and adjusted according to supply and demand in operation.
2) An ownership certificate may be automatically issued and withdrawn according to exercise demand.
3) The obtaining cost of options and ownership is automatically adjusted with change of supply and demand, and is in line with a market supply and demand law.
4) Obtaining and redemption of an ownership certificate are not bound by the third party, that is, ownership is fully exercised.

5) The above process requires no artificial intervention and no matching.
6) The above process can run continuously without a permanent governance institution after being initiated, even if the initial network node $N_1$ goes offline or exits the network, and the remaining network nodes can still operate the pool of rights normally.
7) Limited right certificates realize controllable unlimited issuance.
8) Generation and dilution of ownership conform to the law of cost in reality.

BRIEF DESCRIPTION OF THE DRAWINGS

FIG. 1 is a schematic diagram of an operation relation of the method of the present invention.

DETAILED DESCRIPTION OF THE INVENTION

The present invention will be further described in detail in combination with the specific embodiments.

Embodiment 1: Digital Governance-Free Solution of Options and Stock Rights

1. After a user Alice maps an asset or enterprise right to online voting/governance (by legal and industrial and commercial means, etc.), a corresponding online entity A of the asset is established (which may be a management system/voting system/decision system/dividend account, etc.).
2. Alice connects to the network using her own computing device (such as a personal computer) and creates a network shared storage that allows access by other network devices (including but not limited to shared memory, shared files, shared databases, or shared data blocks);
3. A data structure S is established on the network shared storage and the elements of the initialized data structure S are correspondingly mapped to the operation interface of the online entity A in a corresponding proportion; a data structure corresponding to the equity operation is established and initialized on the local computing device as an operation pool T and mapped to the network shared storage, or directly established and initialized on the network shared storage as an operation pool T; the initialized sets of instructions corresponding to the G operation and E operation are stored in the network shared storage or broadcasted to other network nodes.
4. Alice issues options and stock rights for A as follows: issuing 10,000 option tokens with locked-in permission that represent 10,000 options of A (i.e., t=10000), taking 5,000 locked-in and dollar-pegged tokens (or stable currencies, etc.) as pricing certificates (i.e., c=5000), and issuing the locked-in permission of t and c to the data structure T of the operation pool on the network shared storage through the local computing device; establishing the variable ratio group $G_1$={5000, 10000}; performing T=T+$G_1$={0,0}+{5000, 10000}={5000,10000} on the data structures T and S of the network shared storage, $s_1=t_1=10000$, where $s_1$ is the number of certificates s and recorded into S={10000}, corresponding to 100% of stock rights of A. The new 10,000 certificates s are held by Alice, and 5,000 pricing certificates and 10,000 option certificates are locked by T, which means that the operator Alice initially issues 10,000 shares for A, holds the 10,000 shares and owns 100% ownership of A
5. After an operation pool T is established and initialized as described above, a certificate price ratio in the T satisfies $$p_t = \frac{c_1}{t_1} = \frac{5000}{10000} 0.5,$$

that is, a middle price of options of the entity A is 0.5 USD/share in this case. Anyone may transfer the pricing certificates to the T at a transaction price of $$\Delta p_t = \frac{\frac{Ri}{t - \Delta t} - c}{\Delta t}$$

in exchange for the options of A. For example, a user Bob wants to obtain 200 options, and $\Delta t=200$, $\Delta p_t=0.51$. Bob has to pay for 102 pricing certificates to the T, which is equivalent to buying 200 options of A at a price of 0.51 USD/share. The method is as follows: Bob releases the lock permission of 102 pricing certificates to T through any network node, and calls the E operation on the shared storage, and executes T=T+$E_1$ using the ratio group $E_1$={102, −200} on the transaction pool data structure T. After transaction is completed, T={5102, 9800}, T locks Bob's 102 pricing certificates and releases 200 option certificates to Bob and a new middle price of options changes to $$p_t = \frac{c_1}{t_1} = \frac{5102}{9800} = 0.52.$$

The price change is in line with the law of market supply and demand.
6. Bob may further transform the options into stock rights of A, to obtain voting rights and dividends for A, or may only hold the options and sell the options at the right time to make a profit. A behavior of selling options is similar to step 4, in an opposite transaction direction, that is, option tokens are paid for and pricing certificates are obtained.
7. Bob transforms 200 options into stock rights of A (which is exercise) by taking 104.12 corresponding pricing certificates c to create a right group $G_2$={104.12, 200} according to a proportion of $$\frac{t_2}{c_2} = \frac{t_T}{c_T} = \frac{9800}{5102} = \frac{200}{104.12};$$

and executing T=T+$G_2$={5206.12, 10,000}, generating 200 $s_2$, and recording S={10000, 200}, which means that 200 shares of A are additionally issued, and are held by Bob. The total number of shares of A changes to 10,200. Alice still holds 10,000 shares of A, and a stock-owned proportion changes to $$\frac{10000}{10200} = 98.04\%;$$

and Bob obtains $$\frac{200}{10200} = 1.96\%$$

of stock rights of A. Exercise does not affect an option price.

8. Bob takes the number of held s as stock rights, exercises a decision/voting/dividend right for A, and gains income, or may also sell held stock rights at an appropriate time. An operation way of selling stock rights is similar to that of step 6, with an opposite operation direction. With selling 100 shares by Bob as an example, Bob pays for 100 s to T, and obtains 100 option certificates, and $$\frac{100 \times c_T}{t_T}$$

pricing certificates. After selling is completed, S={10000, 200, −100}, and the total number of shares changes to 10,100, such that stock-owned proportions of Alice and Bob also change accordingly. Selling does not affect an option price.

9. Selling operation may also be set according to a proportion of certificates s in S, that is, option tokens accounting for an equal proportion in T and corresponding pricing certificates may be sold according to an ownership proportion of certificates s. The selling method may be applied to cases having a stock capital dilution mechanism.

10. In the above process, after initialization of S and T (that is, a first batch of stock right issuance) is completed, governance-free operation may be started. All operations are triggered by a user transaction request or voting request, and a system may automatically complete option transaction, stock right issuance and repurchase, voting right exercise, dividend distribution and other actions without matching.

Embodiment 2: Autonomous Operation and Governance of an Online Community

1. Alice, Bob and Coy, founders of the online community, have willings to support community operation by means of rational right incentives, regulate community governance by means of voting rights, and attract and recruit new core members by means of option incomes. The voting rights are planned to be divided equally for Alice, Bob and Coy, and a new voting right may be added only under the condition that approval votes account for more than half of all votes; 25% of options are reserved for new core members, and the new core members may obtain the incentives only under the condition that approval votes account for more than two-thirds of all votes.

2. Any one of Alice, Bob, or Coy can establish a data structure S on the network shared storage (including but not limited to shared memory, shared files, shared databases, or shared data blocks) via their computing devices (such as personal computers), establishing a proportional mapping relationship between the online community's operation/voting system and data structure S; establish a voting counting structure $V_s$ (the counting results of Vs enable or reject the update operation of data structure S); establish a jointly-controlled account $V_t$ that is controlled by the voting results to store the corresponding reserved option rewards; establish an initial data structure T={0,0} as the operation pool T on the network shared storage, initialize the instruction sets of G operation and E operation and store them on the network shared storage or broadcast them to other network nodes.

3. t=4,000 option tokens are issued to represent 4,000 options, 1,000 option tokens are allocated to each of private accounts of Alice, Bob and Coy, and 1,000 option tokens are allocated to the voting custodial account $V_t$.

4. Alice, Bob and Coy select the pricing certificates, agree on a same $p_t$, and establish variable ratio groups according to G={100, 1000} separately, to obtain $G_a$, $G_b$ and $G_c$; and an operation pool data structure T is established, the three people send T=T+$G_{[a|b|c]}$ to T with their own private accounts, T further requests S to execute an update operation, the three people execute voting by the voting structure V when voting results are satisfied, $s_a$, $s_b$ and $s_c$ are issued to the private accounts of Alice, Bob and Coy, and S is updated to S={1000, 1000, 1000}. s is a voting right certificate or stock right. The community generates 3,000 voting rights, and Alice, Bob and Coy each obtain 1,000 voting rights.

5. A current middle price of options in the operation pool T satisfies $$p_t = \frac{300}{3000} = 0.1.$$

Anyone may obtain community options by paying for the pricing certificates, and the options may be sold at the right time to make the person gain benefits. Only when the options obtain more than half of votes in the voting structure $V_s$, voting rights may be obtained by creating a new variable ratio group $G_i$ and submitting it to T.

6. There are currently 1,000 options in the voting custodial account $V_t$. Due to existence of $p_t$, the options have values, and may be exchanged for the pricing certificates in T, or used to create new $G_i$ in exchange for the voting rights. The account is set to execute paying when the number of votes exceeds two-thirds. When the community decides to give option incentives to a specific member, Alice, Bob and Coy exercise their voting rights to dominate the incentives.

7. The above process is also suitable for control of stock right issuance and government of option incentives in Embodiment 1.

Embodiment 3: Self-Help Investment and Financing of Startup Projects

1. Alice plans to transfer 40% of stock rights to raise $400,000 for her startup project.

2. Alice maps the startup project to online voting/governance (by legal and industrial and commercial means, etc.), a corresponding online entity A of the asset is established (which may be a management system/voting system/decision system/dividend account, etc.).

3. Alice may establish a data structure S is on the existing network shared storage and map the elements of the data structure S to the operation interface of online entity A in a corresponding proportion. A pool T, along with the initial data structure, is established as the operation pool, and the instruction set corresponding to the G operation and E operation that can be applied to T is initialized and stored on the network shared storage or broadcasted to other nodes in the network.

4. Alice issues options and stock rights for A by issuing t=10,000 option tokens to represent 10,000 options of A, taking c=60 tokens (or stable currencies, etc.) anchored to US dollars as pricing certificates, and establishing a variable ratio group $G_1=\{60, 6000\}$; and executing $T=T+G_1=\{0, 0\}+\{60, 6000\}=\{60, 6000\}$, generating 6,000 $s_1$, and recording $S=\{6000\}$. $s_1$ is an ownership certificate, and corresponds to 100% of stock rights of A, which means that the operator Alice initially issues 6000 shares for A, holds the 6000 shares and owns 100% ownership of A.

5. After an operation pool T is established, a certificate price ratio in the T satisfies $$p_t = \frac{c_1}{t_1} = \frac{60}{6000} = 0.01,$$

that is, a middle price of options of the entity A is 0.01 USD/share in this case. Anyone may transfer the pricing certificates to the T at a transaction price of $$\Delta p_t = \frac{\frac{Ri}{t-\Delta t} - c}{\Delta t}$$

in exchange for the options of A. For example, a user Bob wants to obtain 1000 options, and $\Delta p_t=0.012$. Bob has to pay for 12 pricing certificates to the T, which is equivalent to buying 1000 options of A at a price of 0.012 USD/share. After transaction is completed, $T=\{72, 5000\}$, and a new middle price of options changes to $$p_t = \frac{c_1}{t_1} = \frac{72}{5000} = 0.0144.$$

The price change is in line with the law of market supply and demand.

6. After the operation in step 4, Alice still holds 4,000 extra-pool tokens. Alice may use the extra-pool tokens to implement financing. Before financing, Alice needs to adjust a value of the options to 100 USD/share. The method includes the steps that Alice buys 5,940 options from T, destroys or locks the options, such that $T=\{6000, 60\}$, and in this case, a middle price of the options in T is 100 USD/share.

7. Alice transfers 4,000 extra-pool options to an investor, the investor Coy takes 400,000 corresponding pricing certificates to create a right group $G_2=\{400000, 4000\}$ according to a proportion of $$\frac{t_2}{c_2} = \frac{t_T}{c_T} = \frac{60}{6000} = \frac{400}{400000},$$

executes $T=T+G_2=\{406000, 4060\}$, generates 4000 $s_2$, and records $S=\{6000, 4000\}$, which means that 4,000 shares of A are additionally issued, and are held by Coy. The total number of shares of A changes to 10,000. Alice still holds 6,000 shares of A, and a stock-owned proportion changes to $$\frac{6000}{10000} = 60\%;$$

and Coy obtains $$\frac{4000}{10000} = 40\%$$

of stock rights of A.

8. Usually, in operation, if a fair value of the startup project of Alice may reach 100 USD/share, Alice does not need to adjust the value herself in step 6, but the market completes value approximation by itself.

Embodiment 4: Global Copy Operation Pool

1. On the local storage of any computing device (including but not limited to memory, files, databases, block devices, etc.), establish data structure S, map the elements of data structure S to the ownership operation interfaces (voting/governance/dividend) of online entity A in a corresponding proportion, and open the read-write interfaces of S to other nodes in the network.

2. On the local storage of any computing device including but not limited to memory, files, databases, block devices, etc.), establish data structure T, establish and initialize the instruction sets corresponding to G operations and E operations that can be applied to T, and open the read-write and execution interfaces of T, G, and E to other nodes in the network, a variable ratio group {c, t} is set up, t=10,000 option tokens are issued to represent 10,000 options of A, c=5,000 tokens (or stable currencies, etc.) anchored to US dollars are taken as pricing certificates, a variable ratio group {5000, 10000} is established, operation G is executed on T, $G_1=\{5000, 10000\}$, $T=T+G_1=\{0, 0\}+\{5000, 10000\}=\{5000, 10000\}$, 10,000 $s_1$ are generated, and $S=\{10000\}$ is recorded. $s_1$ is an ownership certificate, and corresponds to 100% ownership of A.

3. In a distributed or decentralized environment, the data structure T is synchronized to any working node in a network in a way of global copy; before executing the operation G and operation E on T, any node needs to synchronize with the whole network to obtain a latest copy of T, so as to ensure the operation G or E executed on the latest T.

4. Because T is semantically self-consistent, any node may ensure that a right exchange and exercise process is correct and complete only by keeping the operation G or E on the latest T.

Embodiment 5: Discrete Distributed Operation Pool

1. On the local storage of any computing device (including but not limited to memory, file, database, block device, etc.), establish a sequenced discrete data structure S, map the elements of the data structure S to the ownership operation interfaces (voting governance/dividend) of online entity A in respective proportions, and open the read/write operation interfaces of S to other nodes in the network 2. On the local storage of any computing device (including but not limited to memory, file, database, block device, etc.), establish a sequenced discrete data structure T, establish and initialize the instruction set corresponding to the G and E operations that can be applied to T, and open the read/write and execution operation interfaces of T, G, and E to other nodes in the network, a variable ratio group {c, t} is set up, t=10,000 option tokens are issued to represent 10,000 options of A, c=5,000 tokens (or stable currencies, etc.) anchored to US dollars are taken as pricing certificates, a variable ratio group {5000, 10000} is established, operation G is executed on T, $G_1=\{5000, 10000\}$, $T=T+G_1=\{0, 0\}+\{5000, 10000\}=\{5000, 10000\}$, 10,000 $s_1$ are generated, and S={10000} is recorded. $s_1$ is an ownership certificate, and corresponds to 100% ownership of A.

3. The data structure T records operation G and operation E according to the sequence. T may be distributed and stored in different nodes.

4. In a distributed environment or a decentralized environment, any node may obtain the latest $R_i$ and $\Delta p_t$ by synchronizing with other nodes and traversing all G and E operation sequences of the T; and according to the $R_i$ and $\Delta p_t$, new operation G or E may be created and submitted to any node for implementation, after successful implementation, records of T and S are updated, pricing certificates or option tokens are released, and exercise or exchange is completed.

5. Because T is semantically self-consistent, it may be ensured that a right exchange and exercise process is correct and complete only by keeping using the latest $R_i$ and $\Delta p_t$ for implementing the operation G or E on T.

The present invention may be applied to the field of blockchain, where the certificates may be tokens.

The above descriptions are merely concise embodiments of the present invention and merely used for describing the method of the present invention, instead of limiting the protection scope of the present invention. Any modifications, equivalent substitutions, improvements, etc. within the spirit and principles of the present invention are intended to fall within the protection scope of the present invention.

What is claimed is:

1. A method for value mapping and exercise of digital rights, comprising:

a network node creates a data structure as an operation pool T and two operations acting on the operation pool T: operation G and operation E, which are then synchronized to a network shared storage or broadcast to other network nodes, the operation G refers to the implementation of increase or decrease elements in the operation pool data structure T in a same direction and to increase or decrease certificates s accordingly, and the operation E is to increase or decrease elements in the operation pool data structure T in an opposite direction and to lock or release certificates corresponding to the elements accordingly; and the network node establishes an ownership certificate collection S and synchronizes it to network shard storage or broadcasts it to other network nodes, an mth element $s_m$ in the ownership certificate collection S is used to record a number of certificates s generated or canceled for mth exercise of an asset A, and the number of s corresponds to a number of voting rights of A, that is, governance rights and ownership of A; taking t digital right tokens X as exercise certificates of the asset A; and taking c another digital right tokens Y as price reference certificates of the asset A, that is, pricing certificates, and setting up a variable ratio group {c, t}, wherein a) ownership of the asset A is obtained by the operation G, an exercise certificate holder a implements exercise for an ith time by the operation G by taking $c_i$ pricing certificates and $t_i$ exercise certificates, and establishing a variable ratio group $G_i=\{c_i, t_i\}$ corresponding to ith operation G; $T=T+G_i$ is executed on the operation pool T, $s_i$ certificates s are generated, and $S=\{s_1, s_2, \ldots, s_i\}$ is updated; the exercise certificate holder a obtains $s_i$ certificates by exercise, which correspond to $$\frac{s_i}{\sum s_i}$$

ownership of the asset A; and corresponding $c_i$ pricing certificates and $t_i$ exercise certificates are locked by the operation pool T;

b) the ownership of the asset A is transferred by the operation G, and the exercise certificate holder a implements transfer for the ith time by the operation G by taking $s_i$ ownership certificates s and establishing the variable ratio group $G_i$ corresponding to the ith operation G; $T=T+G_i$ is executed on the operation pool T, $s_i$ certificates s are locked and canceled by the operation pool T, $S=\{s_1, s_2, \ldots, -s_i\}$ is updated, and $t_i$ exercise certificates and $c_i$ pricing certificates are released to the exercise certificate holder a; and the exercise certificate holder a no longer owns $s_i/\Sigma s_i$ ownership corresponding to the asset A;

c) an exercise certificate is obtained by the operation E, and a pricing certificate holder b obtains the exercise certificate for an hth time by taking $c_h$ pricing certificates and establishing a variable ratio group $E_h=\{c_h, -t_h\}$ corresponding to hth operation E; and $T=T+E_h$ is executed on the operation pool T, and the operation pool T locks $c_h$ pricing certificates and releases $t_h$ exercise certificates to the pricing certificate holder b, such that the pricing certificate holder b exchanges $c_h$ pricing certificates for $t_h$ exercise certificates; and d) a pricing certificate is obtained by the operation E, and an exercise certificate holder C obtains the pricing certificate for the hth time by taking $t_h$ exercise certificates to be transferred and establishing the variable ratio group $E_h$ corresponding to the hth operation E; and $T=T+E_h$ is executed on the operation pool T, and the operation pool T locks $t_h$ exercise certificates and releases $c_h$ pricing certificates to the exercise certificate holder C, such that the exercise certificate holder C exchanges $t_h$ exercise certificates for $c_h$ pricing certificates.

2. The method according to claim 1, wherein when the operation G is executed, a number relation between the certificates s and exercise certificates $t_i$ is $s_i=t_i$.

3. The method according to claim 2, wherein when exercise is executed with an exercise mapping ratio k, the number relation between the certificates s and the exercise certificates $t_i$ is $s_i=t_i/k$.

4. The method according to claim 1, wherein conditions of executing $T=T+G_i$ on the operation pool T comprise satisfying $t_i/c_i=t_T/c_T$ when i>1, and satisfying $c_i>0$, $t_i>0$ when i=1, a reference price ratio of an exercise certificate satisfying $p_r=c_i/t_i=c_T/t_T$, wherein $t_T$ is the number of current exercise certificates in the operation pool T, and $c_T$ is the number of current pricing certificates in the operation pool T.

5. The method according to claim 1, wherein a pooling product $R_i$ is obtained by executing $R_i = c_T \times t_T$ with $c_T$ and $t_T$ after operation $G_i$, and remains unchanged before next operation G; and $R_i \propto c_{TG} \times t_{TG}$, $c_{TG} = \Sigma c_{Gi}$, and $t_{TG} = \Sigma t_{Gi}$.

6. The method according to claim 1, wherein a corresponding functional relation between $c_T$ and $t_T$ in the operation pool T is $t_T = R_i \times c_T^{-1}$, wherein $t_T$ is the number of current exercise certificates in the operation pool T, and $c_T$ is the number of current pricing certificates in the operation pool T.

7. The method according to claim 1, wherein the variable ratio group $G_i = d \times \{c_i, t_i\}$ corresponding to the ith operation G is established, wherein d indicates an operation direction, d is 1 when an ownership certificate obtaining request is implemented, and d is −1 when an ownership certificate transfer request is implemented.

8. The method according to claim 1, wherein the variable ratio group $E_h = d \times \{c_h, -t_h\}$ corresponding to the hth operation E is established, wherein d indicates an operation direction, d is 1 when an exercise certificate obtaining request is implemented, and d is −1 when an exercise certificate transfer request is implemented.

9. The method according to claim 1, wherein when the exercise certificate holder C implements the operation E on the operation pool T, an exchange price ratio of an exercise certificate satisfies $$\Delta p_t = \frac{\frac{Ri}{t_T - \Delta t} - c_T}{\Delta t},$$

and $$t_h = \frac{c_h}{\Delta p_t};$$

and when a pricing certificate holder implements the operation E on the operation pool T, an exchange price ratio of a pricing certificate satisfies $$\Delta p_c = \frac{\frac{Ri}{c_T - \Delta c} - t_T}{\Delta c},$$

and $$c_h = \frac{t_h}{\Delta p_c}.$$

* * * * *